Oct. 14, 1969     C. R. LYON     3,471,875
PORTABLE FISHING FLOAT
Filed Feb. 29, 1968     2 Sheets-Sheet 1
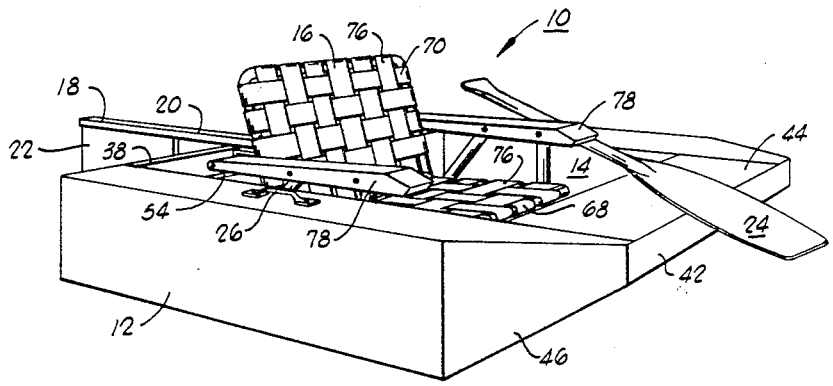
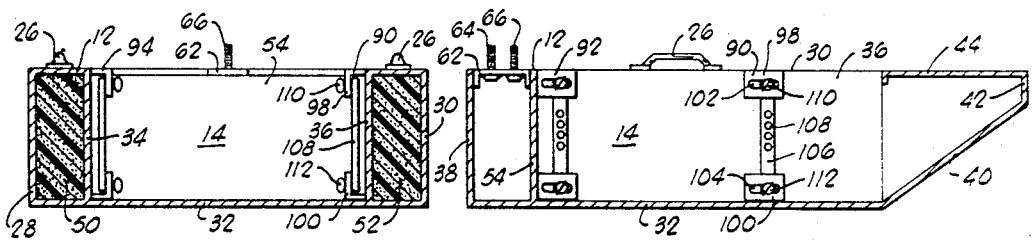
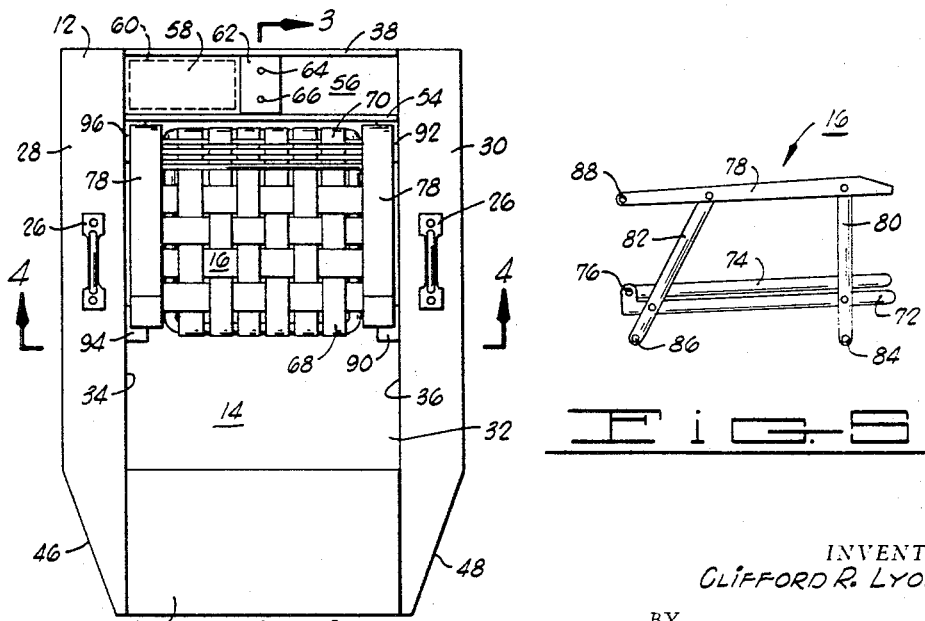
INVENTOR.
CLIFFORD R. LYON
BY Dunlap, Laney & Hessin
ATTORNEYS

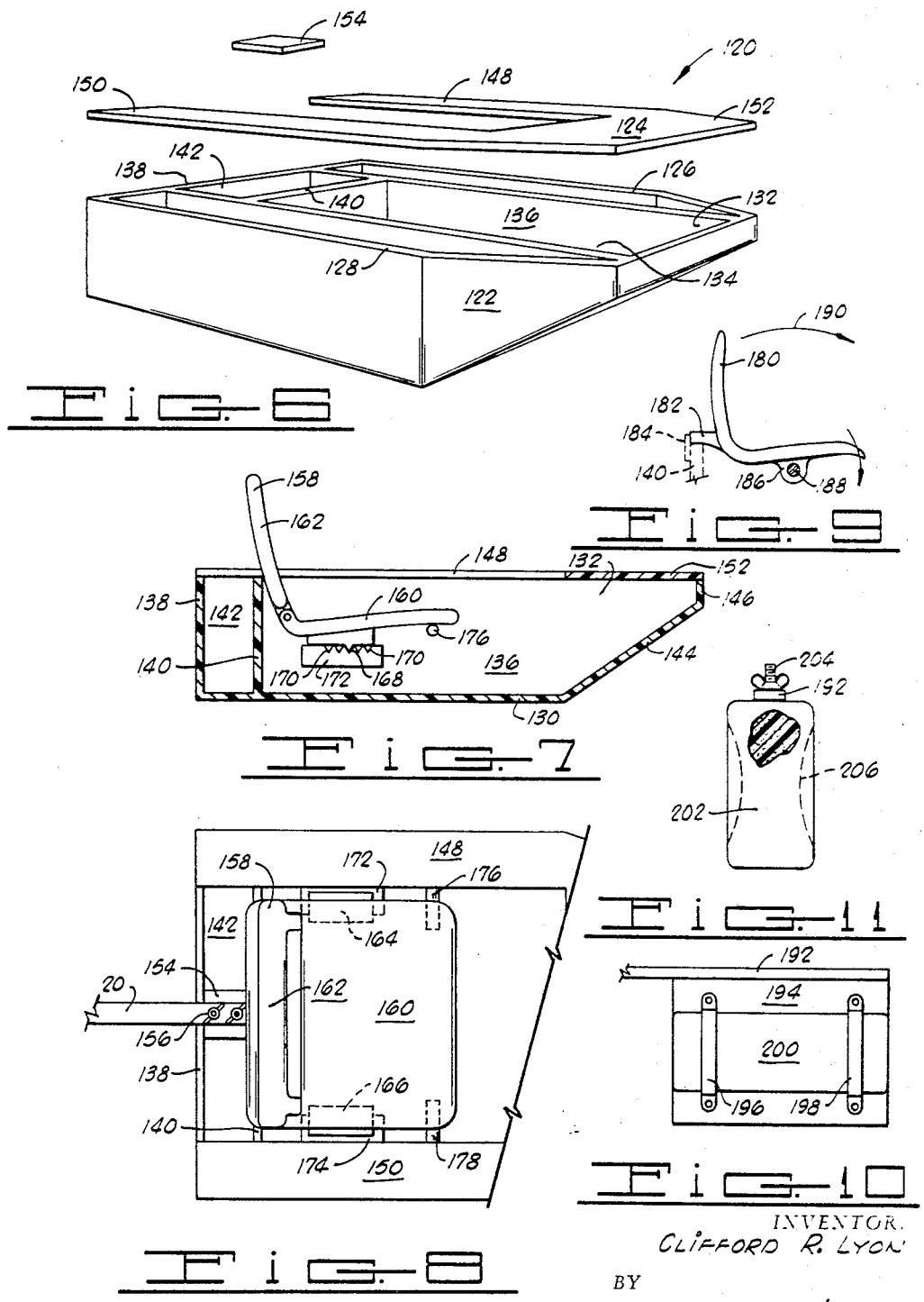

United States Patent Office 3,471,875
Patented Oct. 14, 1969

3,471,875
PORTABLE FISHING FLOAT
Clifford R. Lyon, P.O. Box 216,
Wilburton, Okla. 74578
Filed Feb. 29, 1968, Ser. No. 709,447
Int. Cl. B63b 7/00, 5/00
U.S. Cl. 9—2                                    12 Claims

ABSTRACT OF THE DISCLOSURE

Apparatus of lightweight and relatively small size for use by an individual for movement or positioning on a body of water for the purpose of fishing or the like, the apparatus consisting of a small-sized hull member of generally rectangular shape and including an outboard-rigged, detachable stabilizer member for maintaining float attitude; the float to include a seat which is supported within the float in readily movable position to provide adjustment for the center of gravity of the float plus occupant.

BACKGROUND OF THE INVENTION

Field of the invention

The invention relates generally to portable, small-sized float devices and, more particularly, but not by way of limitation, it relates to an improved fishing float apparatus having specific advantages as to portability, both as to weight and size accommodation, and requisite comfort and reliability.

Description of the prior art

The prior art includes a great many types of portable water craft, both boat and float type. The previous structures have generally been formed in keeping with an understanding of "portability" present in the marine field which connotates only that the vessels be hauled out and carrice by some land-based means, and such portability measures are not usually concerned with easy hand-carrying and storage out of sight in small enclosures. There are also a few of the smaller types of floats known, however, these vessels of simple construction are primarily intended for bathing usage in swimming pools and such, there being little or no intention to keep the occupant dry or in such a relaxed but poised position to pursue such as the many different angling manipulations and movements.

SUMMARY OF THE INVENTION

The present invention contemplates a small, lightweight float capable of keeping the occupant dry and on course while resisting spinning or other sideways float movements. In a more limited aspect, the invention consists of a light-weight hull member including buoyant ballasting means and detachable boom means providing stabilization contact with the surrounding water; further, the well portion of the hull member is adapted to contain a seat therein in easily movable affixure so that it can be adjusted to balance the center of gravity of the hull member plus occupant in whatever seating or fishing attitude selected. Additionally, the invention contemplates a mode of construction for forming the float member and movable seat from inexpensive, easily worked, lightweight plastic materials.

Therefore, it is an object of the present invention to provide a float which is unsinkable, extremely light in weight, and which can be placed within relatively small enclosures, e.g. the trunk of an automobile.

It is also an object of the invention to provide a lightweight, one-man float which is ideal for fishing use, and which can be constructed by simple and highly economical methods.

Finally, it is an object of the present invention to provide a fishermen's float which can be easily carried with one hand by the average user.

Other objects and advantages of the invention will be evident from the following detailed description when read in conjunction with the accompanying drawings which illustrate the invention.

BRIEF DESCRIPTION OF THE DRAWINGS

FIG. 1 is a perspective view showing one form of the present invention in an operating attitude;

FIG. 2 is a top view of the device of FIG. 1;

FIG. 3 is a section taken along the lines 3—3 of FIG. 2;

FIG. 4 is a section taken along the lines 4—4 of FIG. 2;

FIG. 5 is a skeletal side view showing the structure of the folding seat as shown in FIG. 1;

FIG. 6 is an exploded perspective of a two-piece form of hull member constructed in accordance with the present invention;

FIG. 7 is a sectional side view of the hull member of FIG. 6 including an alternative form of seat and seat support structure;

FIG. 8 is a top view of the seat and seat support structure of FIG. 7 as disposed in a float;

FIG. 9 is an alternative form of seat member;

FIG. 10 is an alternative form of stabilizer which can be employed in the present invention;

FIG. 11 is a partially cutaway end view of still another alternative form of stabilizer.

DESCRIPTION OF THE INVENTION

As shown in FIG. 1, a float 10 consists of a hull member 12 having a well portion 14 with a seat member 16 adjustably secured therein. Float stabilization is provided by means of a stabilizer 18 which consists of a boom 20 suitably secured to the rear of hull member 12 and supporting a vertical panel 22 into a surrounding water medium. A conventional type of oar 24 may be employed for propulsion or, alternatively, a small form of electric trolling motor can be employed. One or more handles 26 are secured to hull member 12 at balanced points to provide easy handling of the structure.

With further reference to FIGS. 2, 3 and 4, the unitary nature of the construction of hull member 12 becomes apparent. The hull member 12 consists of a right side panel enclosure 28 and a left side panel enclosure 30 which are each disposed in parallel relationship and sealingly connected upon each side of a bottom panel 32. Respective side panel portions 34 and 36 of side panel enclosures 28 and 30 join at approximately a perpendicular juncture to bottom panel 32 to define the cockpit or well portion 14. The rear side of hull member 12 is completed by a rear panel 38 which is secured in perpendicular relationship to bottom panel 32 and extending between opposite side panels 34 and 36.

The forward side of hull member 12 is shaped with slightly more aquatic leanings tending toward a shaped prow and angled freeboard. Thus, the front structure may be formed by a front panel 40 sealingly connected between side panels 34 and 36 and connected to bottom panel 32 at an obtuse angle thereto. The front panel 40 may include a short bent portion 42 as well as an upper front panel 44 which is sealingly connected between the forward edge of the side panel enclosures 28 and 30 to form a deck portion. Also the outer front edges of both of side panel enclosures 28 and 30 are formed with respective inward tapered portions 46 and 48.

The materials and methods of joinder may be selected from various known types, the controlling factors being the maintaining of a light-weight unit. A float 10 has been constructed and has performed to good advantage utilizing twenty gauge sheet aluminum and having all junctures lap riveted and sealed with commercial sealing compound e.g. epoxy waterproof seal. Still other materials may be preferable from the standpoint of volume production of the article as will be further described below.

Each of the side panel enclosures 28 and 30 is filled with a selected type of foamed or expanded plastic, viz. respective foamed plastic blocks 50 and 52. The foam plastic blocks 50 and 52 may be cut from pre-expanded plastic block or they may be expanded in situe by conventional methods with the side panel enclosures providing the necessary confinement. Further, each of the foamed plastic blocks 50 and 52 may be cast to have a predetermined weight per volume so that pre-selected buoyancy characteristics will be imparted to hull member 12. There are various flotation materials which are suitable for use within side panel enclosures 28 and 30, e.g. various forms of styrofoam, expanded polyurethanes, etc. and, in particular, one expanded plastic known as "Corofoam" which is commercially available from Cook Paint and Varnish Co. of Kansas City, Mo.

A partitioning panel 54 is secured to bottom panel 32 between side panels 34 and 36 in parallel and slightly displaced disposition to rear panel 38. The partitioning panel 54 thus forms a storage well 56 which provides dry storage on board hull member 12. It may be desirable too to line one side 58 of storage well 56 with a suitable insulator such as additional foam plastic, shown by dash-line 60, to serve as a refrigeration compartment for snacks, cold drinks, etc. A securing panel 62 is rigidly fastened between the upper, central edges of rear panel 38 and partitioning panel 54 to provide a securing point for the boom 20 of stabilizer 18. A pair of bolts 64 and 66 are suitably secured up through securing panel 62 for engagement with boom 20 and such as easily manipulable wing nuts may then be employed to secure boom 20 in place on the bolts 64 and 66.

The seat 16 is preferably formed with a seat member 68 having a foldable back member 70 pivotally secured thereto. Referring also to FIG. 5, the seat 16 is formed by a seat frame 72 and a back frame 74 which are pivotally secured at pivot points 76 located on each side of the rear edge of seat frame 72. Each of the seat frames 72 and back frame 74 may be covered over with suitable support materials such as resilient plastic bands 76. A plurality of such resilient bands 76 can be interwoven about each of the seat frame 72 and back frame 74 to provide a comfortable supporting surface. A pair of arm rests 78 are supported on each side of seat 16 by means of forward posts 80 and rearward posts 82. Each of the forward and rearward posts 80 and 82 are rigidly affixed to the respective chair arm 78 and the respective side of seat frame 72 for extension therebelow to terminate as respective securing eyes 84 and 86. The securing eyes 84 and 86 serve to provide adjustable support within the float well 14 as will be further described below. The back 70 of seat 16 may be retained in the upright position by securing each side of back frame 74 through a respective securing eye 88 disposed at the after end of each chair arm 78.

The seat 16 is mounted within float well 14 with provision for center of gravity adjustment by means of four quadilaterally arranged adjustment assemblies 90, 92, 94 and 96. The adjustment assemblies 90 and 92 are secured to left side panel 36 in spaced and generally balanced relationship while opposite adjusting assemblies 94 and 96 are similarly disposed on the opposite side panel 34. Each of adjusting assemblies 90–96 are similarly constructed and affixed and, as particularly described for adjusting assembly 90, this includes an upper bracket 98 and a lower bracket 100 each having respective elongated slots 102 and 104. A securing strap 106 having a plurality of securing holes 108 therealong is then adjustably secured between brackets 102 and 104 by respective wing nuts 110 and 112 or other such easily manipulatable securing device. Thus, the securing straps 106 for each of adjusting assemblies 90–96 can be secured at various positions along the longitudinal length of float 12 so that the center of gravity of the float 12, seat 16 and occupant can be readily adjusted.

The seat 16 is supported within adjusting assembly 90–96 by means of the respective pairs of securing eyes 84 and 86 on each side of seat 16. Also, another adjustment can be made as to the heighth of seat 16 within float well 14 by selection of the particular securing holes 108. The respective securing eyes 84 and 86 can then be secured through a selected securing hole 108 by means of a suitable pin fastener of conventional type.

In operation, the float 10 can be easily stored or carried in the trunk of an automobile, the back section of a station wagon, or even resting on the back seat of a more or less standard-sized automobile. The entire float 10 with all its appurtenances can be constructed so that its total weight is less than thirty-five (35) pounds, and such equipment can be easily handled and carried with one hand by the average user. Float 10 is light enough with handles 26 optimally placed so that it can be easily held out and placed into a water body from even the most precarious shoreline terrain or footing conditions.

It is generally intended that the front edge of hull member 12 be held next to the shore line whereupon the occupant or user can step into hull member 12 to be supported by bottom panel 32. He may then turn around and sit down in the seat 16 whereupon he can lean backwards slightly to free the front end of hull member 12 from any contact with the bottom so that hull member 12 floats free. Thereafter, the occupant can adjust seat 16 by means of adjusting assemblies 90–96 for best floating attitude. This is, in effect, a center of gravity adjustment which takes the occupants weight and weight distribution into consideration along with the hull member 12 and stabilizer assembly 18. Once the balancing adjustments are effected, the user can then employ propulsion, as by means of paddle 24, to move the boat 10 along a prescribed course for sight-seeing or to a fishing hole or whatever.

Anchoring means may be carried on board the float 10 and secured from such as the portage handles 26 if water currents become a problem to the fisherman. The storage well 56 may be employed for holding various ancillary equipment such as flash lights, fishing bait, and so forth. Also, the forward portion of float well 14 is sufficiently large so that the user can put his feet in comfortable position therein and the space under seat 16 can still be employed for storage of such as a fishing tackle box etc.

FIGS. 6, 7 and 8 show the manner in which a similar form of the invention can be constructed entirely from well-known forms of plastics having the requisite strength characteristics, and which can be easily and economically manufactured. Thus, as shown in FIG. 6, a hull member 120 may be easily constructed from two molded pieces, a bottom portion 122 and a top portion 124. The bottom portion 122 consists of respective left and right side panel enclosures 126 and 128 each molded integral with and extending upward from a bottom panel 130 (see also FIG. 7). The inner sides of each of enclosures 126 and 128 are formed as side panels 132 and 134 which define a float well 136 therebetween. Also in integral formation are a rear panel 138 and partioning panel 140 which extend transversely between side panels 132 and 134 and which define a storage well 142 therebetween. The front part of the hull lower portion 122 is then formed with an upward tapered portion 144 which terminates in a bow panel 146.

The upper hull portion 124 is a single, uni-planar piece consisting of left and right deck panels 148 and 150 joined through a forward deck panel portion 152. Thus, the upper hull portion 124 can be suitably bonded on top of lower hull portion 122 so that the side deck portions 148 and 150 provide sealed cover over respective left and right side panel enclosures 126 and 128 and the forward deck portion 124 provides deck space across the front of hull member 120. Once again, a selected form of commercially available expandable plastic or other sculptured block foam plastic is inserted within the side panel enclosures 126 and 128 to provide flotation of predetermined buoyancy. A securing panel 154 may also be bonded by fastening means between the central portions of upper edges of rear panel 138 and partitioning panel 140 to provide a mounting surface for the boom 20 of the stabilizer element. This may take the form of the previously described form of stabilizer 18 as detachably secured to mounting panel 154 by such as a plurality of wing nut assemblies 156.

The plastic fabrication also allows for a novel form of seat and seat mounting structure as is depicted in FIGS. 7 and 8. Thus, a seat 158 may be formed of plastic in two parts, a seat portion 160 with a back portion 162 pivotally affixed thereto. A pair of support blocks 164 and 166, also formed from suitable plastic, are bonded or otherwise secured to opposite edges of the underside of seat member 160. Each of support blocks 164 and 166 has a transversely disposed ridge 168 formed on its bottom surface, these ridges 168 providing an engaging key to be supported within a selected one of a plurality of grooves 170 which are also transversely disposed in the upper surface of respective left and right supporting blocks 172 and 174. The supporting blocks 172 and 174 may be formed integral with side panels 132 and 134, but it would probably be preferable to provide for separate formation and bonding by a suitable epoxy reaction. Similarly, a pair of seat support stubs 176 and 178 would be secured forward of support blocks 172 and 174 to support the front edge of seat 158. It should be apparent then the seat 158 can be very easily adjusted as to longitudinal disposition within hull well 136 by merely lifting seat portion 160 and moving it to the front or to the rear until the ridges 168 on each side find secure engagement with a desired one of the grooves 170.

FIG. 9 shows still another alternative form of seat 180 which can be employed in the invention. The seat 180 is molded from a selected plastic with its base and back portions integral. A stub 182 is formed on the center of the back portion near its base to extend rearward therefrom as a supporting stub to rest on such as partitioning panel 140. If desired, a suitable form of releasable latch or clasp 184 may be employed to lock seat 180 in its upright position. A transverse pivot way 186 is molded across the underside of seat 180 to provide pivotal disposition of seat 180 on a pivot rod 188. Thus, a shaft or pivot rod 188 may be suitably fastened and supported between opposite side panels 132 and 134 with the seat 180 pivotally secured thereon. The seat 180 can then be rotated in the direction of the arrows 190 for stowage so that the seat will fold down below comb level of the float in non-interfering disposition.

It is also contemplated that operation may arise where it is desirable to further adjust the balance of the float by adding flotation to the stabilizer element. Thus, an alternative form of stabilizer is shown in FIG. 10 with a boom 192 supporting a stabilizer panel 194 which includes brackets 196 and 198 holding a predetermined amount of buoyant material 200 in proper position. The buoyant material 200 may be such as foam plastic blocks or other equivalent material. The bracket fixtures or equivalents should be located on each side of stabilizer panel 194 to maintain a balanced stabilization relationship.

FIG. 11 shows still another alternative form of stabilizer consisting of boom 192 supporting a block of floatation material 202 which functions as a vertical stabilizer element. The block of material 202 may be formed of such as foam plastic and mounted from boom 192 by wing nut assemblies 204 or similar fasteners. The dimensions, such as vertical height and thickness of the foam block 202, may be varied in accordance with exigencies of particular situations and, indeed, it may be desirable to contour the vertical surfaces as shown by dash-line 206 to gain certain additional advantages.

The foregoing discloses a novel one-man float structure which can be constructed to be extremely light in weight and of such optimum balance as to be easily handled. The device provides multiple adjustments which enable changing of seat disposition so that proper, balanced center of gravity can be had for any user while occupying the float. The device is light-weight yet balanced and exposing sufficient vertical surfaces so that it is easily propelled and maneuvered on a body of water; and in addition to providing dry, comfortable seating for a fisherman, it still includes a sufficient amount of storage space for all necessary items.

It is also contemplated that many variations of overall shape of the float device may be constructed while gaining advantage of the similar attributes of light-weight, compactness, adjustability of balance factors, etc. It should be noted too that the various fastener elements and bonding processes employed in the invention may be conventional types, accepted rules of selection governing.

Changes may be made in the combination and arrangement of elements as heretofore set forth in the specifications and shown in the drawings; it being understood that changes may be made in the embodiments disclosed without departing from the spirit and scope of the invention.

What is claimed is:
1. A portable float for providing dry, seated access to a selected location on a body of water for fishing or the like, comprising:
  a unitarily formed, generally rectangular hull member having a bottom panel, front and rear panels, and side panels, each of said side panels being formed as an elongated enclosure defining a closed interior space;
  means retained within each of said side panel enclosures to impart predetermined buoyancy to said hull member;
  a pair of support means each secured on the inner side of each one of said side panels, each support means having plural support positions disposed longitudinally therealong;
  seat means;
  a pair of securing means each secured at the side on the underside of said seat means, said securing means each being selectively affixable in respective support positions of each of said support means to provide center of gravity adjustment for said hull member; and
  stabilizer means secured to said rear panel and extending outboard to expose an area of vertical surface in the water, said surface providing resistance against surounding water in response to any circular movement of said hull member.

2. A portable float as set forth in claim 1 wherein said means retained within each of said side panel enclosures comprises:
  a mass of foam plastic of predetermined weight per volume throughout.

3. A portable float as set forth in claim 1 wherein said seat means comprises:
  a seat portion consisting of an outer frame supporting resilient seating material thereon and having said respective securing means affixed to the underside of said frame; and
  seat back means similarly constructed of an outer frame supporting resilient covering means, said seat back means frame being foldably connected to said seat portion frame.

4. A portable float as set forth in claim 2 wherein said seat means comprises:
   a seat portion consisting of an outer frame supporting resilient seating material thereon and having said respective securing means affixed to the underside of said frame; and
   seat back means similarly constructed of an outer frame supporting resilient covering means, said seat back means frame being foldably connected to said seat portion frame.

5. A portable float as set forth in claim 1 wherein said support means and securing means each comprise:
   a pair of bracket means, one bracket means being secured to the rear edge of said side panel innerside and the other bracket means being secured to forward portion of said side panel innerside;
   a pair of securing strap means each adjustably affixed to respective bracket means to be held at a predetermined longitudinal position along said side panel innerside, said strap means each including plural securing holes therealong;
   a pair of securing pin means secured on each side of the underside of said seat means for adjustable affixure to a securing hole of the securing strap means at one of a plurality of selected heights.

6. A portable boat as set forth in claim 1 wherein said support means and securing means each comprise:
   block means having a plurality of transverse grooves along its upper surface, said block means being rigidly secured to the side panel innerside;
   securing block means having a single transverse ridge formed on its bottom side, said securing block means being secured on each side of the underside of said seat means such that said seat means can be rested with respective oppositely disposed securing block ridges placed in selected grooves of said support block means.

7. A portable float as set forth in claim 4 wherein said stabilizer means comprises:
   boom means having one end detachably secured to said hull member rear panel;
   panel means rigidly secured to the outer end of said boom means and disposed longitudinally to extend vertically downward into said body of water.

8. A portable float as set forth in claim 4 wherein said stabilizer means comprises:
   boom means being detachably secured to said hull member rear panel;
   vertical stabilizer means affixed to said boom means in longitudinal disposition to extend downward into the water, said vertical panel including means to adjust the buoyancy of said panel to a predetermined value.

9. A portable float as set forth in claim 1 wherein said hull member is further characterized in that:
   said hull member front panel is joined so that it forms an obtuse angle with said bottom panel; and
   said hull member includes deck panel means extending across its forward portion between the upper surface of said side panels, and transverse dividing means extending transversely across the hull member at a position parallel to and closely adjacent to said rear panel to provide dry storage and access space.

10. A portable float as set forth in claim 1 wherein said hull member comprises:
    a two piece construction of high impact plastic, a first piece being a uni-planar, generally U-shaped section forming the forward deck portion and extending rearward on each side to form the upper surface of each of said side panel enclosures, said second piece forming the remainder of said hull member as a single piece.

11. A portable float as set forth in claim 10 wherein said seat means comprises:
    a seat portion formed of moldable plastic material; and
    a seat back portion formed of moldable plastic material and being pivotally affixed to said seat portion to provide a foldable unit.

12. A portable float as set forth in claim 11 wherein said support securing means each comprise:
    a pair of block means having a plurality of transverse grooves along its upper surface, each of said block means being rigidly secured to opposite side panel innersides; and
    a pair of securing block means having a single transverse ridge formed on its bottom side, each of said securing block means being secured to opposite sides of the underside of said seat means such that said seat means can be rested with respective oppositely disposed securing block means ridges placed in selected ones of said support block means grooves.

References Cited
UNITED STATES PATENTS

| | | | |
|---|---|---|---|
| 1,299,827 | 4/1919 | Edwards | 297—345 X |
| 1,356,558 | 10/1920 | Purcell | 297—345 X |
| 2,009,918 | 7/1935 | Grassi | 297—345 X |
| 2,383,178 | 8/1945 | Edwards | 9—7 |
| 2,627,897 | 2/1953 | Apel | 297—345 X |
| 2,919,451 | 1/1960 | Long. | |
| 3,117,327 | 1/1964 | Mathew | 9—347 |

TRYGVE M. BLIX, Primary Examiner

U.S. Cl. X.R.

9—6, 7